United States Patent
Thorn et al.

(10) Patent No.: US 9,150,790 B2
(45) Date of Patent: Oct. 6, 2015

(54) ROTARY TORREFACTION REACTOR

(75) Inventors: Matt Thorn, Maize, KS (US); Albert Bennett, Haven, KS (US); Samuel Vander-Griend, Wichita, KS (US)

(73) Assignee: ICM, Inc., Colwich, KS (US)

( * ) Notice: Subject to any disclaimer, the term of this patent is extended or adjusted under 35 U.S.C. 154(b) by 485 days.

(21) Appl. No.: 13/100,055

(22) Filed: May 3, 2011

(65) Prior Publication Data

US 2011/0265373 A1 Nov. 3, 2011

Related U.S. Application Data

(60) Provisional application No. 61/330,831, filed on May 3, 2010.

(51) Int. Cl.
| | |
|---|---|
| *C10L 5/40* | (2006.01) |
| *C10L 3/00* | (2006.01) |
| *B01J 8/10* | (2006.01) |
| *C10B 47/30* | (2006.01) |
| *C10B 53/02* | (2006.01) |
| *C10L 5/44* | (2006.01) |
| *C10L 9/08* | (2006.01) |

(52) U.S. Cl.
CPC ............... *C10B 47/30* (2013.01); *C10B 53/02* (2013.01); *C10L 5/44* (2013.01); *C10L 9/083* (2013.01); *Y02E 50/10* (2013.01); *Y02E 50/14* (2013.01); *Y02E 50/15* (2013.01); *Y02E 50/30* (2013.01)

(58) Field of Classification Search
CPC ........... C10B 47/30; C10B 53/02; C10L 5/44; C10L 9/083; Y02E 50/10; Y02E 50/14; Y02E 50/15; Y02E 50/30
USPC ......... 34/33, 128; 44/605, 606, 629; 422/198, 422/209
See application file for complete search history.

(56) References Cited

U.S. PATENT DOCUMENTS

| | | | |
|---|---|---|---|
| 3,777,810 A | 12/1973 | Phillips | |
| 3,800,865 A | 4/1974 | Onarheim et al. | |
| 4,074,751 A | 2/1978 | Ducasse | |
| 4,301,860 A | 11/1981 | Pozzi | |
| 4,353,413 A | 10/1982 | Allen et al. | |
| 4,589,354 A * | 5/1986 | Faehnle | 110/246 |

(Continued)

FOREIGN PATENT DOCUMENTS

| | | |
|---|---|---|
| EP | 1890080 A2 | 2/2008 |
| FR | 799659 A | 6/1936 |

(Continued)

OTHER PUBLICATIONS

English Translation of FR2734343A1.*

(Continued)

*Primary Examiner* — James Goloboy
*Assistant Examiner* — Latosha Hines
(74) *Attorney, Agent, or Firm* — Schwegman Lundberg & Woessner, P.A.

(57) ABSTRACT

A device includes a rotary drum and a fluid conduit. The rotary drum has a horizontal rotation axis and the drum has a sealed inlet end and a sealed outlet end. The drum is configured to receive biomass proximate the inlet end and has a discharge port proximate an outlet end. The fluid conduit is disposed along an inner surface of the drum. The fluid conduit is configured to carry heated fluid and has a coupling external to the drum.

8 Claims, 3 Drawing Sheets

(56) References Cited

U.S. PATENT DOCUMENTS

| | | | |
|---|---|---|---|
| 5,216,821 | A | 6/1993 | McCabe et al. |
| 5,555,639 | A | 9/1996 | Livingston et al. |
| 6,209,225 | B1 | 4/2001 | Villarroel et al. |
| 6,415,527 | B1 | 7/2002 | Rasanen et al. |
| 7,758,235 | B1 | 7/2010 | Collette |
| 2008/0155854 | A1 | 7/2008 | Ives |
| 2008/0229610 | A1 | 9/2008 | Ronning |
| 2011/0041393 | A1 | 2/2011 | Sugita et al. |

FOREIGN PATENT DOCUMENTS

| | | | |
|---|---|---|---|
| FR | 816309 | A | 8/1937 |
| FR | 1532059 | A | 7/1968 |
| FR | 2734343 | A1 * | 11/1996 |
| FR | 2734343 | A1 | 11/1996 |
| WO | WO-200905939 | A1 | 4/2009 |
| WO | WO-2011139356 | A1 | 11/2011 |

OTHER PUBLICATIONS

"European Application Serial No. 11721590.5, Examination Notification Art. 94(3) mailed Sep. 26, 2013", 6 pgs.

"International Application Serial No. PCT/US2011/000769, Preliminary Report on Patentability mailed Nov. 15, 2012", 7 pgs.

"International Application Serial No. PCT/US2011/000769, International Search Report mailed Aug. 24, 2011", 6 pgs.

"International Application Serial No. PCT/US2011/000769, Written Opinion mailed Aug. 24, 2011", 5 pgs.

Perry, Robert H., et al., "Perry's Chemical Engineers' Handbook, Sixth Edition", New York: McGraw Hill Book Company, (1984), 20-38 through 20-40.

European Application Serial No. 11721590.5, Amendment filed Jul. 18, 2013, 10 pgs.

European Application Serial No. 11721590.5, Response filed Feb. 4, 2014 to Office Action mailed Sep. 26, 2013, 8 pgs.

* cited by examiner

ROTARY TORREFACTION REACTOR

CLAIM OF PRIORITY

This patent application claims the benefit of priority, under 35 U.S.C. Section 119(e), to Matt Thorn, U.S. Provisional Patent Application Ser. No. 61/330,831, entitled "ROTARY TORREFACTION REACTOR," filed on May 3, 2010, which is hereby incorporated by reference herein in its entirety.

BACKGROUND

Torrefaction is a thermo-chemical treatment of biomass in the range of approximately 300-600 degrees Fahrenheit. Biomass can include agricultural residue, refuse-derived fuel, municipal solid waste, urban waste, construction demolition debris, lawn waste, wood chips or other types of feedstock. Torrefaction entails partially decomposing the biomass to form two components—a torrefied biomass (a solid) and off-gas. The resulting torrefied biomass has an increased energy content per unit of mass and the off-gas can be used as an energy source.

Current technology for torrefaction is inadequate.

OVERVIEW

An example device includes a rotary drum and a fluid conduit. The rotary drum has a generally horizontal rotation axis and a sealed inlet end and a sealed outlet end. In one example, the rotation axis is pitched to promote movement of the contents through the length of the drum under the force of gravity. In one example, internal structure (such as flights) within the drum is used to promote movement of the contents. The drum is configured to receive biomass at an entry port proximate the inlet end, convey the biomass to the outlet end and discharge the resulting product from a discharge port proximate an outlet end. Other combinations are also possible, including receiving heating fluid at a discharge end of the reactor.

In one example, a fluid-carrying conduit is disposed along an inner surface of the drum. The conduit is configured to carry heated fluid and has a coupling external to the drum. The coupling provides a fluid-tight joint and allows rotation of the drum.

The fluid conduit is coupled to an interior surface of the drum and is thus carried with rotation of the drum. The fluid conduit, heated by a thermal fluid carried within, provides heat to produce a continuous supply of torrefied biomass in the drum. After torrefaction, the biomass is discharged from one or more ports on the shell of the drum.

These examples can be combined in any permutation or combination. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
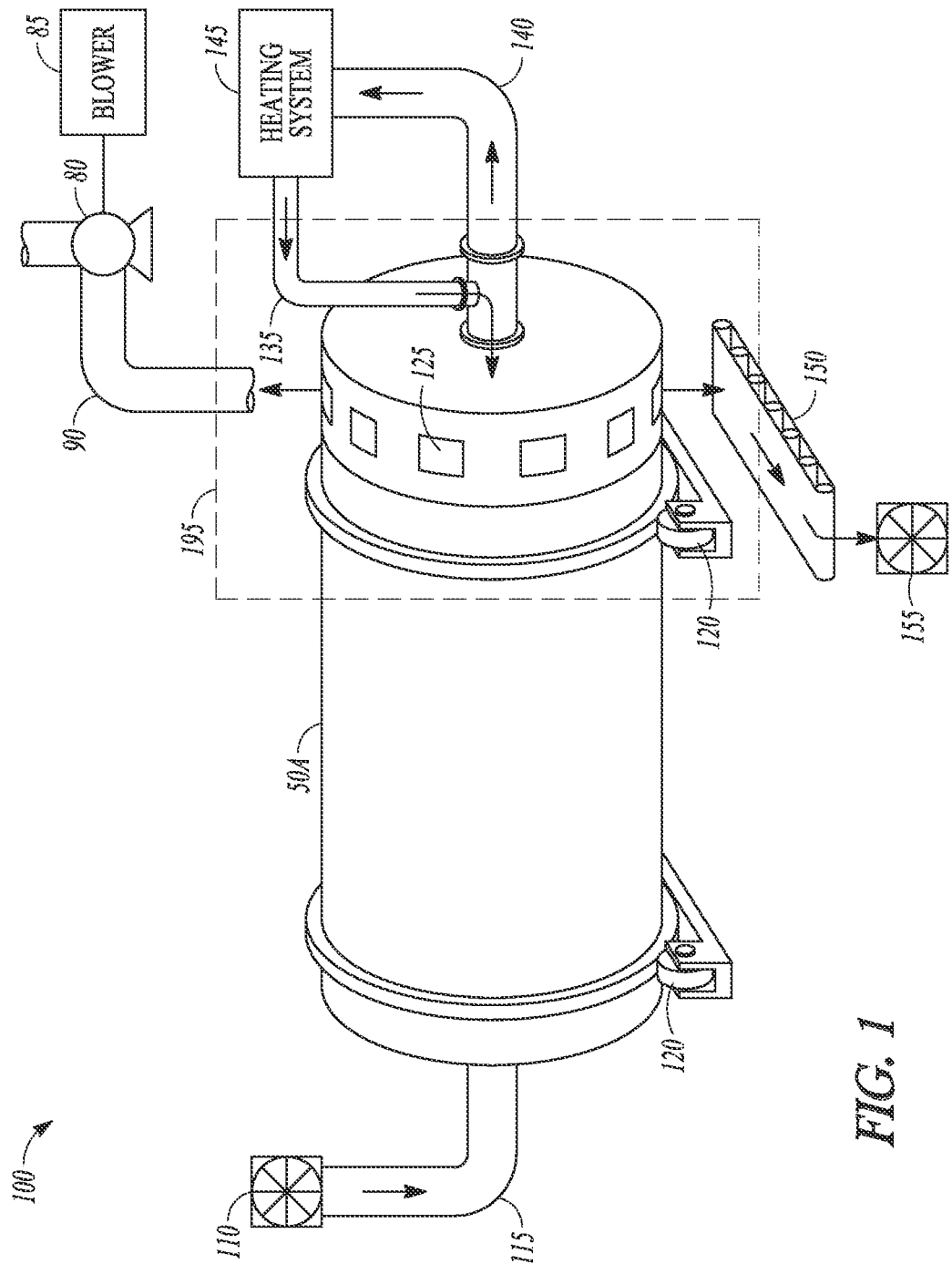
FIG. 1 illustrates a schematic of a system according to one example.

FIG. 1 illustrates a schematic of system 100 according to one example. System 100 includes reactor 50A having input 115 coupled to an input end and output 125 coupled to an output end. Input 115 receives material for delivery to the interior of the drum (as shown at arrow marked inlet). In addition, system 100 includes heating system 145 configured to supply thermal fluid to reactor 50A via conduit 135 and receive thermal fluid from reactor 50A via conduit 140.

Reactor 50A includes a drum aligned on an axis as shown in dotted line. The axis is substantially horizontal and can be described as such, however, in one example the axis is at a slight incline (pitched) to allow gravity to facilitate discharge of product from output 125.

Reactor 50A is sloped or has in internal configuration such that the biomass inlet end 115 conveys the product to the outlet end 125. Torrefied biomass is discharged from ports 125 on the shell of reactor 50A.

The center axis of the drum can have a slope. A slope in the axis can promote movement of the material in the drum. In one example, the slope is approximately ½ inch per foot of length of the drum. Other angles are also possible.

Reactor 50A is supported on bearings 120 that allow the drum to rotate along the center axis. Air locks 110 and 155 are located at the inlet end and outlet ends of reactor 50A, respectively. In one example, bearings 120 are driven by an electric motor.

Biomass is supplied to reactor 50A by conveyer 115, which, in the example illustrated, includes air lock 110.

Reactor 50A includes output port 125 proximate an output end. Port 125, in the example illustrated, includes a plurality of apertures distributed about the shell of reactor 50A. The figure illustrates one example having a plurality of rectangular apertures. Discharge from output port 125 falls under gravity from the reactor 50A and is received by conveyer 150. Conveyor 150 carries the material away from reactor 50A to air lock 155. The arrangement of elements shown can be changed. For example, the air lock can precede the conveyer.

Off-gas can be pulled from the discharge end using hood 195 (shown generally in dotted lines). Hood 195 can include a formed metal housing that captures the off-gas. Discharge of the torrefied output drops under gravity to the bottom and off-gas (syngas) is captured in the upper portions of the hood. A blower or fan 80 (driven by motor 85) carries off the off-gas.

Reactor 50A receives thermal fluid from heating system 145. Thermal fluid discharged from heating system 145 is routed to rotary joint 130 via conduit 135. In one example, rotary joint 130 supplies thermal fluid in an annular region about a central line of rotary joint 130. Discharge from reactor 50A is carried by the central line through rotary joint 130 and is conveyed to heating system 145 via return line 140. Heating system 145 can include any type of heating source for a thermal fluid. In various examples, the thermal fluid includes heated water, oil, glycol, or other thermal transfer fluid.

In one example, the atmosphere within reactor 50A is maintained at a low oxygen level. The atmosphere within reactor 50A can be controlled by line 90 coupled to reactor 50A. Line 90 can be used to create a vacuum from blower 85 powered by motor 80.

Figure 2:
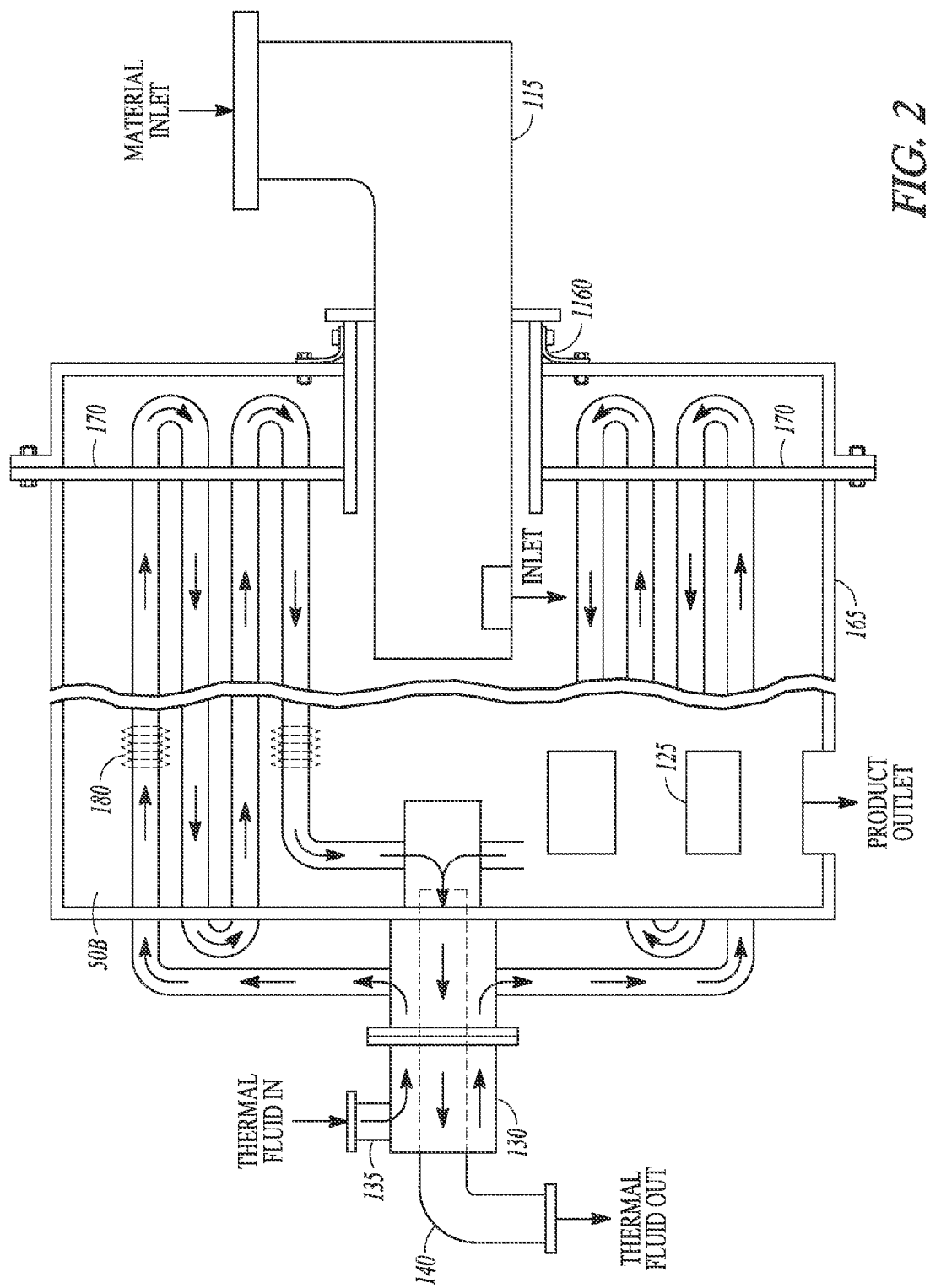
FIG. 2 illustrates a partial sectional view of a reactor according to one example.

FIG. 2 illustrates a partial sectional view of reactor 50B according to one example. Reactor 50B includes drum shell 165 and inner structure 170. Inner structure 170, in the example illustrated, includes plates having holes affixed to the inner surface of drum shell 165. The holes are sized to accommodate conduit 175. In the example shown, conduit 175 is configured to circulate thermal fluid throughout the length of reactor 50B and includes an inlet and an outlet at the end near rotary joint 130. In one example, conduit 175 is fitted with thermal expansion joints 180. Thermal expansion joint 180 includes a coupling or joint to allow for thermal expansion of conduit 175. In one example, conduit 175 is configured in a manner that does not need a thermal expansion joint 180. For example, conduit 175 is affixed to the drum at an interface with an end of the drum proximate the joint 130 and is free to thermally grow (expand) at an interface with structure 170.

A single conduit 175 is illustrated in the figure, but in one example, three separate conduits are located near an output end of reactor 50B. In the example shown, discharge ports 125 are distributed about the circumference of drum shell 165 near the outlet end.

Input port 115 carries biomass to the interior of reactor 50B. Seal 160 includes a leaf-type seal having a circumferential biasing spring, cable, or other means for establishing a substantially airtight joint while allowing reactor 50B to rotate on an axis.

As shown in the figure, thermal fluid enters at port 135 and passes through a first passage of rotary joint 130 where it is distributed to conduit 175. Discharge from conduit 175 is routed through a second passage of rotary joint 130 via adapter 220. Adapter 220 includes two fluid-carrying channels—an outer channel to carry fluid into reactor 50B and an inner channel to carry fluid out of reactor 50B. Rotary joint 130 provides a manifold to carry thermal fluid both in and out of reactor 50B.

The reactor, sometimes called a dryer, can be sized for a particular operation. In one example, the reactor has a diameter of 11 feet, 9 inches and an overall length of 70 feet. The reactor can have other dimensions. In one example, conduit 175 has a nominal diameter of 4 inches; other conduit dimensions are also contemplated, including, for examples, 2" pipe or 3" pipe. Conduit 175, as illustrated, is supported by flue supports. In the example shown, twenty-seven rows of lifting flights, each of approximately 2 inches height are uniformly spaced around the interior of the drum. The reactor is pitched so that, with rotation, the product flows through the drum.

The thermal fluid is heated to approximately 600 degrees Fahrenheit and is supplied to rotary joint 130. Rotary joint 130 supplies the thermal fluid to the rotating reactor. In one example, the thermal fluid is split into four flow paths. Each flow path is routed to carry thermal fluid down the length of the reactor in a 4 inch conduit. Following a serpentine route within the interior of the reactor, the thermal fluid is discharged from the reactor via rotary joint 130. In one example, the fluid is carried in the reactor in a single flow path, however any number of flow paths can be configured, including two, three, four, five, six, or more flow paths.

In other example, the thermal fluid is heated to a temperature between approximately 375 and 700 degrees Fahrenheit.

Torrefaction, according to one example, occurs in a low oxygen environment. Rotary seals are provided on the inlet and outlet to minimize infiltration air. Dry biomass is supplied to the reactor through an air lock. Heat from the thermal fluid is transferred to the biomass converting the biomass into a torrefied product. At the end of the reactor, the torrefied product drops out of discharge openings. A conveyor is configured to convey the torrefied product to another air lock. The reactor can be operated at atmospheric pressure to slight vacuum. Vapors can be pulled out the end of reactor and can be used for process energy.

Figure 3:
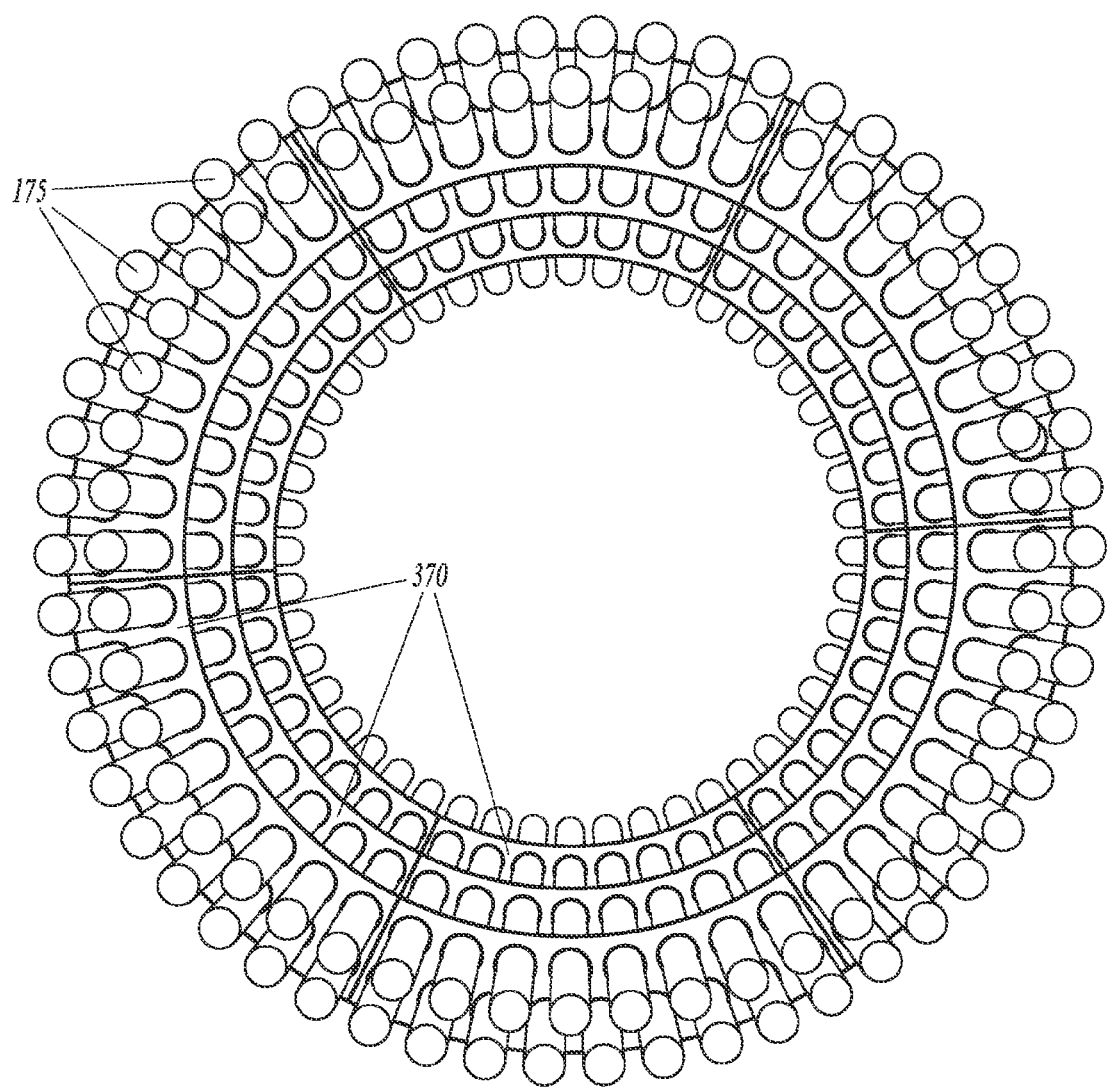
FIG. 3 illustrates a view of a reactor according to one example.

FIG. 3 illustrates an interior view of reactor 50C. Reactor 50C includes a plurality of conduits 175 aligned with the horizontal axis. Conduits 175 are supported by structure 370. Structure 370 can include a formed plate that carries the conduit and is affixed to an inner surface of the reactor 50C by, for example, a weld joint.

The reactor, along with the network of conduit 175, rotates on its horizontal axis. Biomass introduced into the interior of the reactor comes into contact with the conduits while being tumbled. The tumbling action, and the slight pitch of the axis, carries the biomass through the length of the reactor while roasting the biomass at controlled temperature, and upon discharge from the reactor, the biomass material has become torrefied.

Additional Notes

Variations are also contemplated. For example, a hooded exhaust can be provided near discharge ports 125 to carry off vapors.

Various thermal fluids can be used. In one example, the fluid is an oil-based product.

An example of the present subject matter can provide process control of heat transfer and retention time to improve biomass torrefaction. The present subject matter can be configured to handle feedstock having a wide variety of moisture content. The biomass starting material for torrefaction can be derived from various sources, including log handling, debarking, and wood chipping. Downstream processing can include pelletization of the torrefied product.

One example of the present subject matter can include a rotary pre-dryer and secondary rotary torrefaction reactors that accept material, such as micro-chipped green wood from round wood logs.

An example of the present subject matter can produce a fuel for electrical power generation, and thus allow for substitution of biomass for coal. Torrefied wood has a higher calorific value than other biomass-based feedstocks, with a similar BTU output to coal.

In one example, a first end of the drum is configured to receive the incoming material and the second end of the drum is configured to discharge torrefied material and convey both incoming and outgoing thermal fluid. Other configurations are also contemplated. For example, the incoming thermal fluid can be introduced at an end opposite that of the outgoing thermal fluid. In one example, the discharged terrified material exits the drum at an end opposite that of a fluid connection carrying thermal fluid.

In one example, a flange of the rotary joint is spaced apart from an end plate of the drum. In another example, the flange of the rotary joint is coupled to the end plate of the drum. In this configuration, the thermal fluid is distributed to the conduit within the drum itself rather than distributed to the conduits at a location external to the drum.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The claimed invention is:

1. A device comprising:
   a rotary drum having a horizontal rotational axis, the drum having a sealed inlet end and a sealed outlet end, the drum configured to receive biomass proximate the inlet end and having a discharge port proximate an outlet end; and
   a fluid conduit along an inner surface of the drum, the fluid conduit configured to carry heated fluid, the fluid conduit coupled to a rotary joint, the rotary joint coupled to the drum, and further wherein the rotary joint includes a first fluid passage and a second fluid passage, the first fluid passage independent of the second fluid passage.

2. The device of claim 1 wherein the rotary drum a rotary seal at the inlet end or the outlet end.

3. The device of claim 1 wherein the first fluid passage of the rotary joint is configured to carry the fluid into the fluid conduit and the second fluid passage of the rotary joint is configured to carry the fluid out of the fluid conduit.

4. The device of claim 1 wherein the fluid conduit includes a plurality of lines.

5. The device of claim 1 wherein the fluid conduit is configured to remain in fixed relation with the drum.

6. The device of claim 1 wherein the fluid conduit is configured to carry oil.

7. The device of claim 1 further including a blower configured to modulate an atmosphere within the drum.

8. The device of claim 1 wherein the discharge port includes a plurality of annular apertures.

* * * * *